United States Patent [19]

Rühl

[11] Patent Number: 4,610,524
[45] Date of Patent: Sep. 9, 1986

[54] DIAPHRAGM BLADES

[75] Inventor: Friedel Rühl, Wetzlar, Fed. Rep. of Germany

[73] Assignee: Ernst Leitz Wetzlar GmbH, Wetzlar, Fed. Rep. of Germany

[21] Appl. No.: 714,499

[22] Filed: Mar. 21, 1985

[30] Foreign Application Priority Data

Mar. 31, 1984 [DE] Fed. Rep. of Germany ....... 3412061

[51] Int. Cl.$^4$ .................... G03B 9/02; G02B 26/02
[52] U.S. Cl. ................................. 354/274; 350/266
[58] Field of Search ............... 354/270, 274, 230, 250, 354/261, 264, 265; 350/266

[56] References Cited

U.S. PATENT DOCUMENTS 3,062,120  11/1962  Mahn .................................. 354/270
3,433,142   3/1969  King ................................ 354/274 X
3,727,531   4/1973  Baab ................................... 354/274
4,009,946   3/1977  Geyer et al. ...................... 354/274 X

FOREIGN PATENT DOCUMENTS 1058834  6/1959  Fed. Rep. of Germany ...... 354/274

Primary Examiner—William B. Perkey
Attorney, Agent, or Firm—Schwartz, Jeffery, Schwaab, Mack, Blumenthal & Evans

[57] ABSTRACT

Diaphragm blades for iris diaphragms of optical instrument each with a bearing pin and a control pin are described, in which, as a bearing pin and/or control pin, at least one body with a guide area bent in all three coordinate directions and a circular cross-selection is provided. The body is fixed on the blade surface or in a bore made in the latter by means of a welding or adhesion operation or similar means.

14 Claims, 7 Drawing Figures

DIAPHRAGM BLADES

BACKGROUND OF THE INVENTION

The invention relates to diaphragm blades for iris diaphragms of optical instruments, in which each diaphragm blade has a bearing pin and a control pin.

It is known to use cylindrical solid or hollow rivets as bearing pins and control pins for diaphragm blades. The disadvantage of such a pin is that production tolerances, both between the bearing bore and the bearing pin, and between the control cam and the control pin, can give rise to undesired play. This results in lost motion which is particularly troublesome when making small adjustment movements.

In order to overcome this disadvantage, it has therefore been proposed, for example in German Pat. No. 1,058,834, to design a bearing pin and a control pin as a cone, the greatest diameter of which is greater than the clearance of the control cam or greater than the diameter of the bearing bore.

However, a general disadvantage of both bearing pin and control pin forms, is that only with some effort can they be fixed perpendicularly to the diaphragm blade. This is neccessary, however, in order to prevent an increased friction between the bearing and the control elements resulting from tilting of the bearing pin or control pin in the bearing bores or control cams of the iris diaphragm mount and demanding increased actuating forces for the diaphragm movement.

SUMMARY OF THE INVENTION

It is therefore an object of the present invention to provide diaphragm blades for iris diaphragms of optical instruments, in which a deviation of the axes of the bearing pin and/or control pin from their ideal position, remains without an adverse effect on friction and adjustment forces in all movement positions.

Another object of the invention is to provide diaphragm blades which are economically producible in a short production time.

In particular, a diaphragm blade of the invention comrpises a leaf having a bearing pin and a control pin each comprising a body with guide area. The guide areas are bent in all three coordinate directions and have a circular cross-section.

Further objects, features and advantages of the present invention will become apparent from the detailed description of preferred embodiments which follows when considered with the attached figures of the drawings.

BRIEF DESCRIPTION OF THE DRAWINGS

The invention is described in more detail below and exemplary embodiments are illustrated diagrammatically in the drawings in which.

DETAILED DESCRIPTION OF PREFERRED EMBODIMENTS

The objects of the present invention are achieved by a body with a guide area bent in all three coordinate directions and having a circular cross-section. The body is used as a bearing pin or a control pin and is rigidly fixed on the diaphragm blade.

The figures illustrate a leaf 1, arcuate at its outer and inner edges, of a diaphragm blade, for example, for the iris diaphragm of a photographic lens. In FIGS. 1–4 and 6, this leaf 1 is provided with bores 2, 3 which serve to receive a bearing pin 4 or a control pin 5, respectively.

Figure 1:
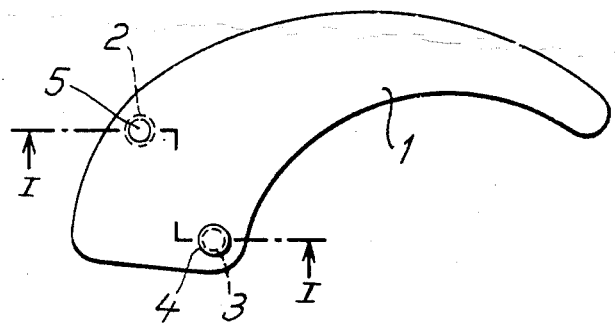
FIG. 1 shows a plan view of a diaphragm blade of the invention.
Figure 2:
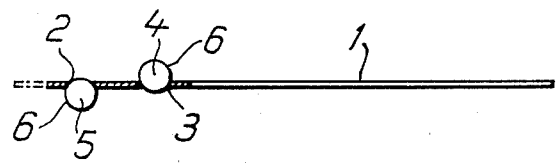
FIGS. 2-6 show sectional side views along the line I—I of exemplary embodiments of the diaphragm blade.

In the case of the exemplary embodiment according to FIG. 2, balls are used as a bearing pin and control pin 4 and 5 respectively and, after self-centering, are fixed by welding in the bores 2,3.

Figure 3:
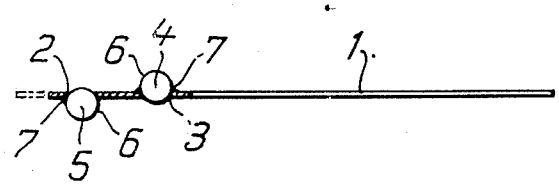

The spherical guide areas 6 of the balls offer the advantage that the bearing pin 4 in the bearing bore, and the control pin 5 in the control cam of the iris diaphragm unit (now shown), are only in annular contact or, on two sides, only in point contact. This means that any toppling and tilting (due to external influences) have no effect on the adjusting forces since the friction between bearing pin 4 and bearing bore on the one hand and control pin 5 and control cam on the other hand do not change. As indicated in FIG. 3, it is also possible to fix the balls serving as the bearing pin and control pin, 4 and 5 respectively, by cementing or adhesion. For this purpose, the bores 2,3 are filled with cement or adhesive and the balls are inserted. A cement or adhesive collar 7 produced thereby increases the strength of the bond between the balls and blade leaf 1.

Figure 4:
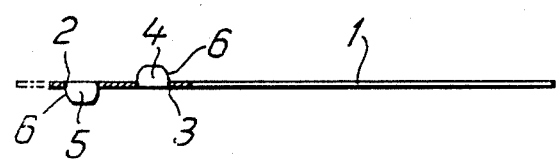

In the case of the exemplary embodiment according to FIG. 4, spherical zone bodies, i.e., balls with opposing truncated areas, are used as a bearing pin and a control pin 4,5 respectively. These bodies are likewise fixed in the bearing bores 2,3 by welding or adhesion. The advantage of this embodiment over that described above is the greater light tightness of the iris diaphragm formed from such diaphragm blades, since the individual blade leaves can more easily lie against one another.

Figure 5:
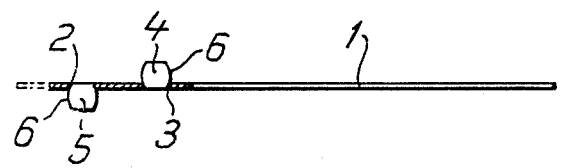

As a further exemplary embodiment, FIG. 5 shows a bearing pin and a control pin 4,5 respectively, the guide areas 6 of which are shaped aspherically, for example as an ellipsoid. They are fixed in ways already described.

Figure 6:
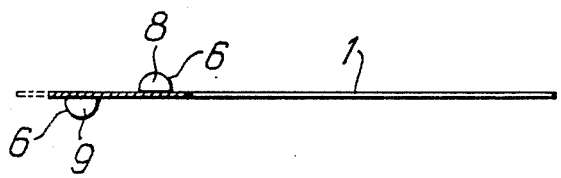

According to FIG. 6, spherical cap or calottes 8,9 can also be used as a bearing pin or control pin and be fixed by their bases on the surface of the leaf 1 of the diaphragm blades by means of welding or adhesion.

Figure 7:
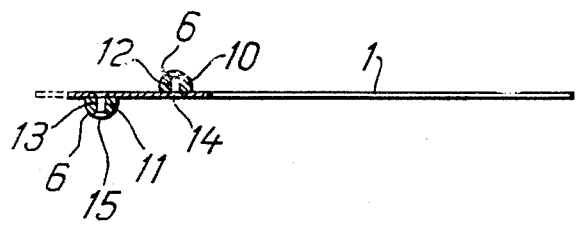
FIG. 7 shows a sectional side view of details of another exemplary embodiment.

It is also possible, as illustrated in the exemplary embodiment of FIG. 7, to rivet the new bearing pin or control pin 4,5 respectively, to the blade leaf 1. Also shown are spherical caps or calottes 10,11, the centers of which bear a rivet bore 12,13 for receiving a rivet 14,15.

In addition to economy in production of the blade/bearing pin or blade/control pin connection by welding or adhesion, a major part is played by the advantage already described above of reduced friction at the bearing or control points due to use of the bodies with guide areas bent in all three coordinate directions. The latter ensures moreover that the operation of the complete iris diaphragm is hardly affected by toppling or tilting of the diaphragm blades.

Another advantage to be noted is that the diaphragm blades of the invention can be inserted and aligned considerably more easily in the blade base or blade guide ring than previously known diaphragm blades. The invention also allows the use of bearing pins or control pins which are made of non-metallic material. In particular, plastic, glass or glass ceramic may be used.

What is claimed is:

1. A diaphragm blade for an iris diaphragm in an optical instrument, comprising a leaf having surfaces which are planar and parallel to one another, said surfaces being equipped in a given position with a bearing pin and a control pin, said pins each comprising a body having a bearing surface curved in all three coordinate directions and having a circular cross-section.

2. A diaphragm blade as claimed in claim 1, wherein said guide area is spherical.

3. A diaphragm blade as claimed in claim 1, wherein said guide area is aspherical.

4. A diaphragm blade as claimed in claim 1, wherein said body has a flattened portion.

5. A diaphragm blade as claimed in claim 1, wherein said body is secured on a surface of said leaf.

6. A diaphragm blade as claimed in claim 1, wherein said body is arranged in a bore in said leaf.

7. A diaphragm blade as claimed in claim 1, wherein a position of said body is established by self-centering.

8. A diaphragm blade as claimed in claim 1, wherein said body is secured to said leaf by means of welding.

9. A diaphragm blade as claimed in claim 1, wherein said body is secured to said leaf by means of adhesive.

10. A diaphragm blade as claimed in claim 1, wherein said body is secured to said leaf by means of riveting.

11. A diaphragm blade as claimed in claim 1, wherein said body is constructed of metallic material.

12. A diaphragm blade as claimed in claim 1, wherein said body is constructed of non-metallic material.

13. A diaphragm blade as claimed in claim 12, wherein said body is constructed of plastic.

14. A diaphragm blade as claimed in claim 12, wherein said body is constructed of glass-ceramic.

* * * * *